April 28, 1953　　　　　　　　L. E. TREES　　　　　　　2,636,744
TRACTOR HITCH
Filed June 4, 1949　　　　　　　　　　　　　　　　2 SHEETS—SHEET 1
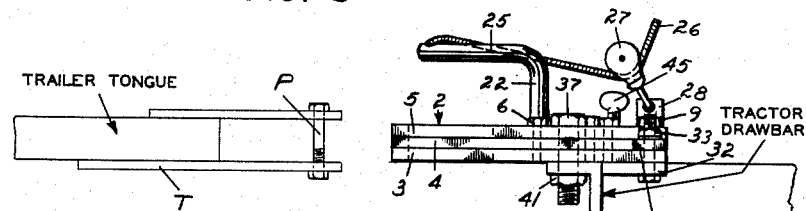
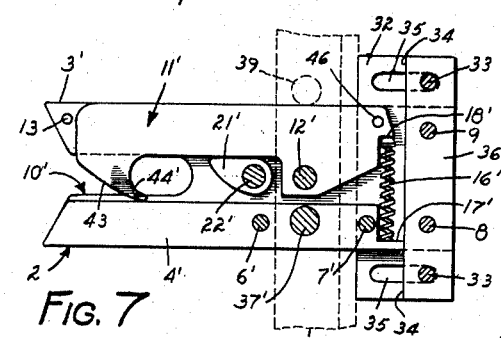
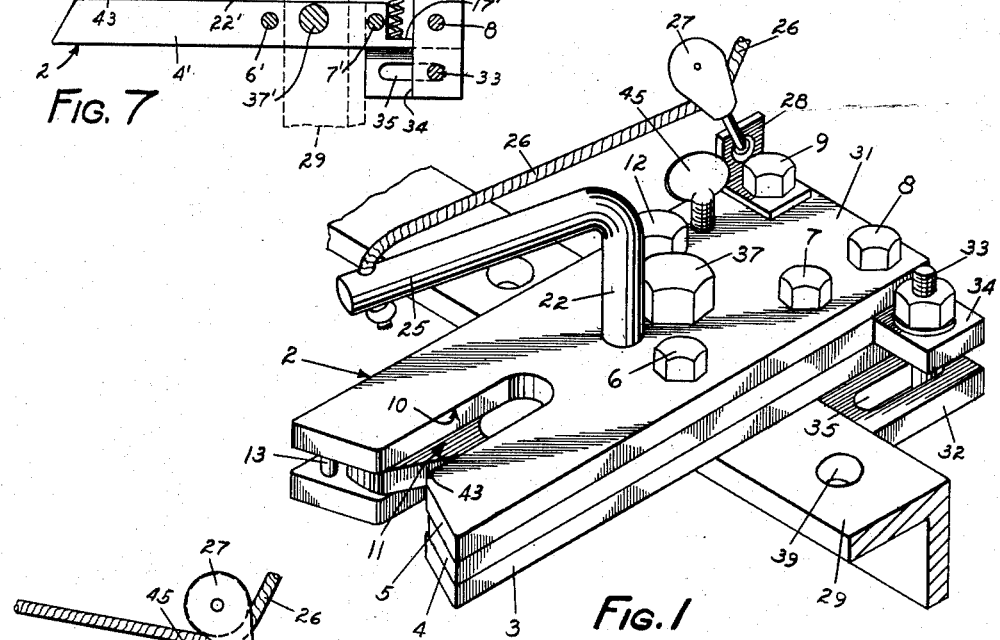
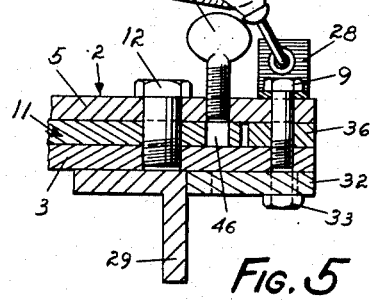
INVENTOR.
LEONARD E. TREES
BY Paul, Paul & Moore
ATTORNEYS April 28, 1953     L. E. TREES     2,636,744
TRACTOR HITCH
Filed June 4, 1949     2 SHEETS—SHEET 2
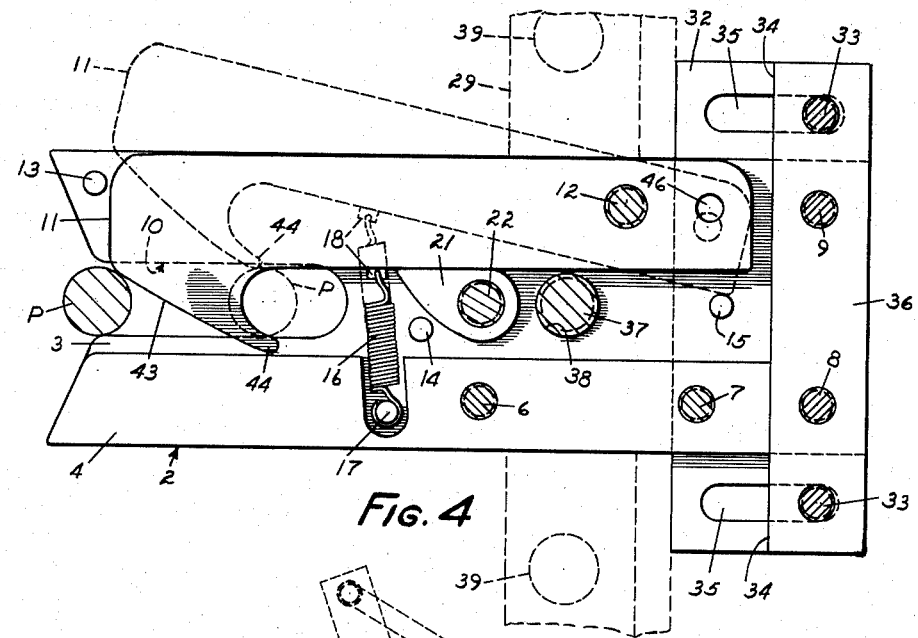
Fig. 4
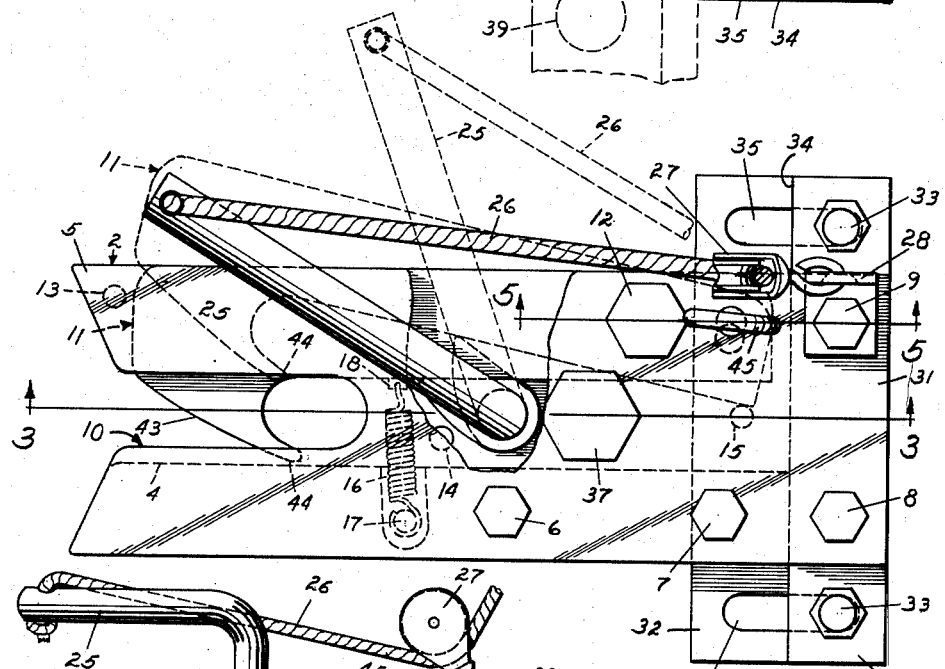
Fig. 2
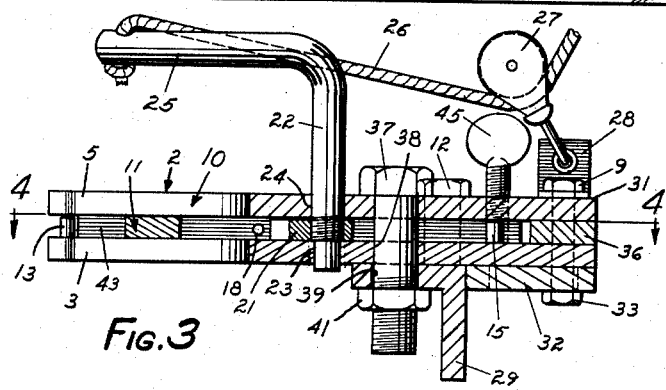
Fig. 3
INVENTOR.
LEONARD E. TREES
BY
ATTORNEYS Patented Apr. 28, 1953

2,636,744

UNITED STATES PATENT OFFICE 2,636,744

TRACTOR HITCH

Leonard E. Trees, Ceylon, Minn.

Application June 4, 1949, Serial No. 97,247

1 Claim. (Cl. 280—33.15)

This invention relates to new and useful improvements in tractor hitches and more particularly to such a device which may be asembled as a unit and quickly applied to the usual draw bar of a tractor.

There are now available numerous types of hitches adapted for use to couple various forms of equipment to a tractor, such as a trailer or numerous farm implements. In the use of some of these implements about a farm, or elsewhere, it may be necessary at times, to shift from one implement to another, whereby it is highly desirable that the hitch be so constructed that the operator of the tractor or power vehicle may readily and quickly uncouple a drawn vehicle or other apparatus from the tractor, and whereby the tractor may as readily be coupled to another vehicle or apparatus to be propelled by simply bringing the hitch into operative engagement with the coupling member provided on the apparatus to be drawn.

An object of the present invention therefore is to provide a simple compact tractor hitch which may be completely assembled as a unit, and having means for quickly hitching it to the usual draw bar of a tractor or other power vehicle.

A further object is to provide such a hitch comprising a spring-actuated latch member having a hook shaped terminal normally traversing an open ended slot in the body of the hitch and so shaped that when the coupling bolt secured to the coupling member of the apparatus to be drawn or propelled enters said slot, the latch member is retracted to permit the coupling bolt of the propelled vehicle to enter to the bottom of said slot, after which the latch member moves into locking engagement therewith to secure the drawn vehicle to the tractor.

A further object is to provide a hitch comprising a body adapted to be seated upon the usual draw bar of a tractor with its forwardly directed end overhanging the draw bar, and an abutment plate being adjustably secured to the forward end of the hitch body and abuttingly engaging the forward face or edge of the draw bar, thereby to facilitate aligning the hitch with the usual spaced apertures in the draw bar, and whereby when the coupling bolt for securing the hitch to the draw bar is removed, the hitch may readily be slid along the draw bar into registry with any selected aperture therein, after which the coupling bolt may readily be inserted through the body of the hitch and into the selected aperture in the draw bar thereby to secure the hitch to the draw bar.

A further and more specific object of the invention is to provide a small compact tractor hitch composed of a plurality of plates which may readily be stamped from sheet metal and secured together in flatwise relation to provide the main body of the hitch, the intermediate plate element being relatively smaller than the top and bottom plate members to provide a cavity within said body for receiving a latch member, said latch member having a crank arm secured thereto, to which one end of a flexible element or cable may be secured, the opposite end of which may be supported adjacent to the operator's seat on the tractor, whereby the operator may readily actuate the latch member to release the load or drawn vehicle from the tractor without leaving his seat on the tractor.

Other objects of the invention reside in the unique construction of the hitch as a whole whereby the various parts thereof which constitute the body of the hitch may be stamped from sheet steel in quantity production; in the means provided for locking the latch member in operative position whereby the latch cannot accidentally be moved into inoperative or load-releasing position, when hauling a load; and in the provision of such a device which may be manufactured in quantity production at low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows.

In the drawings:

Figure 1 is a perspective view of the hitch showing it in position upon a conventional tractor draw bar;

Figure 2 is a plan view of Figure 1, showing in full and dotted lines the open and closed positions of the latch member;

Figure 3 is a longitudinal sectional view on the line 3—3 of Figure 2 on a smaller scale;

Figure 4 is a sectional plan view on the line 4—4 of Figure 3;

Figure 5 is a detail sectional view on the line 5—5 of Figure 2, showing the means for locking the latch member in operative position;

Figure 6 is a schematic view on a relatively smaller scale, showing the hitch in position to engage the coupling member on a trailer or other piece of apparatus to be coupled to the tractor; and Figure 7 is a view similar to Figure 4 showing a slightly modified construction.

The novel hitch herein disclosed is shown comprising a body, generally designated by the numeral 2, shown constructed of a plurality of plate-like elements including a bottom plate 3, intermediate plate or bar 4, and a top plate 5 secured together by bolts 6, 7, 8 and 9, as best shown in Figures 1 and 2. The bottom and top plates 3 and 5, respectively, may be identical in configuration, whereas the intermediate plate 4 is in the form of an elongated bar which merely acts as a spacer to space apart the top and bottom plates thereby to provide a chamber or a cavity within the body 2 for receiving a latch member, generally designated by the numeral 11. The top and bottom plates are shown provided at their rear ends with re-entrant slots which cooperate to provide an open ended slot 10 for receiving the usual coupling pin P of a trailer T or other apparatus to be towed by the tractor.

A latch member 11 is mounted for pivotal movement between the top and bottom plates 5 and 3 by a pivot pin or bolt 12, received in aligned apertures in the top plate 5, and latch member 11, and having its lower end received in threaded engagement with the bottom plate 3. Suitable spacing studs or pins 13, 14, and 15 cooperate with the bar 4 to retain the plates 3 and 5 in spaced relation. The pin 15 also serves as a stop for limiting outward swinging movement of the latch member 11, as indicated by the dotted lines in Figure 4.

A spring 16 has one end secured to a stud 17 shown fixed to the bottom plate 3, and the opposite end of the spring is attached to the latch member 11, as shown at 18, whereby the spring constantly tends to swing the latch member into its operative full line position, shown in Figures 1, 2 and 4.

Means is provided for swinging the latch member outwardly to the dotted line position shown in Figure 4, thereby to uncouple the trailer T or other piece of apparatus from the tractor, as indicated in Figure 6. To thus actuate the latch member 11 to uncouple the trailer or other apparatus, a cam element 21 is shown secured to an upright shaft 22 mounted in suitable bearings 23 and 24 provided respectively in the bottom and top plates 3 and 5 of the hitch body, as best shown in Figure 3. For convenience, the cam element 21 may be secured to the shaft 22 by suitable screw threads which are of such a nature that the cam element is not likely to become loose on the shaft 22 when the hitch is assembled for use, as shown in Figure 1.

The upper end of the shaft 22 is provided with an offset arm 25 to the outer end of which one end of a suitable cable 26 is secured which may have a running connection with a suitable idler sheave 27 secured to the hitch body, as shown at 28 in Figures 1 and 3. The opposite end of the cable may be attached to a fixed portion of the tractor adjacent to the operator's seat whereby the operator may readily grasp the cable and manipulate the cam element 21 to actuate the latch 11, as will be understood by reference to Figure 2. When the cable is released by the operator, the spring 16 returns the latch member to its operative full line positon, shown in Figures 1, 2 and 4.

Another important feature of the invention resides in the means provided to facilitate securing the hitch to the usual draw bar 29 of the tractor. In the application drawings, the draw bar is shown as of angle iron cross section, but it is to be understood that the draw bars of various tractors may vary considerably in configuration and construction, and the hitch herein disclosed readily lends itself for attachment to any form or type of draw bar.

The body 2 of the hitch, as best illustrated in Figures 1 and 6, is elongated in a fore-and-aft direction, and as hereinbefore stated the forwardly directed end portion 31 of the hitch body overhangs the front side of the draw bar. An abutment plate 32 is adjustably secured to the overhanging portion of the hitch body by bolts 33 received in apertures provided in suitable ears or lugs 34 provided at the front end of the body 2 of the hitch. The abutment plate 32 is provided with elongated slots or openings 35, each adapted to receive one of the bolts 33 as shown in Figure 1. The lugs 34 may be formed by a metal bar 36 secured in position between the bottom and top plates 3 and 5, respectively, by the bolts 8 and 9, whereby it becomes, in effect, an integral part of the hitch body 2.

A coupling bolt 37 is adapted to be received in aligned apertures 38 and 39 provided respectively in the hitch body 2 and the draw bar 29, as illustrated in Figure 3. A suitable nut 41 is received in threaded engagement with the coupling bolt 37 to firmly secure the hitch to the draw bar. If desired, a suitable lock washer, not shown, may be interposed between the draw bar 29 and the nut 41.

To secure the hitch to a draw bar, the hitch is placed on top of the draw bar and the coupling bolt 37 is then inserted in the aperture 38 in the hitch body and through a selected aperture 39 in the draw bar. The nut 41 may then be secured to the bolt 37 with the hitched body disposed in right angular relation to the draw bar, as illustrated in Figure 4. The abutment plate 32 is then moved into abutting engagement with the draw bar, as best illustrated in Figures 3 and 6, and firmly secured to the hitch body whereby should the load or pull exerted on the hitch be disposed at an angle to the longitudinal center line of the hitch body, the hitch cannot relatively pivot about the axis of the coupling bolt 37 because of the abutment plate or bar 32 abuttingly engaging the front face of the draw bar, as shown in Figures 1, 3 and 4.

The abutment plate 32 also facilitates positioning the hitch longitudinally of the draw bar because when the coupling bolt is removed from the hitch, the abutment plate, when normally held in contact with the draw bar will assure alignment of the aperture 38 in the hitch body with the spaced apertures 39 of the draw bar in a fore-and-aft direction. In other words, when the abutment plate 32 has been properly secured to the hitch body, and said body is moved along on top of the draw bar with the coupling bolt 37 loosely supported in the aperture 38, when the hitch body passes over an aperture 39 in the draw bar, said bolt may drop by gravity into said aperture, as will be understood by reference to Figure 3.

Thus when the abutment plate 32 of the hitch used on a given tractor has once been secured in proper position thereon, the operation of securing the hitch to the tractor becomes an extremely simple operation.

In the operation of the novel hitch herein disclosed, the cable 26 is normally relaxed whereby the spring 16 retains the latch member in its operative position, shown in Figures 1, 2 and 4. When thus positioned, the latch intersects the open slot 10 at the rear end of the hitch body. Thus when the hitch is moved into engagement with the coupling bolt P of a trailer T, or other apparatus to be propelled, the coupling bolt P enters the open slot 10 in the hitch body and engages the inclined face 43 of the latch member 11 and thereby cams the latch member to one side, as indicated in the dotted lines in Figure 4. When the coupling bolt passes the terminal 44 of the latch member, or engages the bottom of the slot 10, the spring 16 will move the latch member into its operative position by a snap action, whereby the coupling pin of the vehicle to be propelled is operatively coupled to the hitch, as will be understood.

If desired, the latch member may be locked in operative position by a locking pin or screw, generally designated by the numeral 45. The locking screw 45 may be received in threaded engagement with the upper plate 5 of the hitch body, and has its lower terminal arranged to be received in an aperture 46 provided in the latch member, as will be understood by reference to Figures 3, 4, and 5. Normally, however, the locking pin may be retained in its inoperative position, as illustrated in Figure 5, whereby the latch member 11 may be swung freely from one position to the other.

The cable 26 makes it possible for the driver to control the operation of the hitch from the driver's seat. The spring mounting of the latch member and the beveled face 43 thereof makes it possible to couple the hitch to a trailer tongue or to the coupling bolt P or other apparatus or equipment by simply guiding the hitch into engagement with the coupling bolt P of the vehicle to be propelled.

When the load is to be released from the hitch, the operator of the tractor simply exerts a pull on the cable 26, whereby the latch member is moved out of engagement with the coupling bolt P to thereby release the load or apparatus being propelled from the tractor. To thus release the coupling bolt P, it may be necessary to slightly reverse the movement of the tractor with respect to the load to allow the terminal 44 of the latch member to be swung past the coupling bolt P supported in the slot 10 within the hooked end of the latch member.

The novel hitch herein disclosed is extremely simple and inexpensive in construction. All of the parts thereof with the exception of the shaft 22 and the necessary bolts, may be stamped out of sheet stock, after which the parts may be quickly assembled in a suitable jig to provide an extremely practical and efficient hitch of low cost, a highly desirable attribute in a hitch of this general type. While I have herein described the hitch as being used in conjunction with a tractor, it is to be understood that it may find use in other fields where applicable.

In Figure 1 it will be noted that the lugs 34 are spaced upwardly from the abutment plate 32. If deemed necessary, suitable spacing blocks or elements, not shown, may be interposed between the lugs 34 and the abutment plate 32 to relieve the lugs of bending strains when the nuts of the bolts 33 are tightened.

In Figure 7 there is shown a hitch which differs slightly in construction from the hitch shown in the previous figures. The modified hitch comprises a bottom plate 3' having a re-entrant slot 10'. An elongated plate member 4' is seated on the bottom plate 3' and a top plate, not shown, is secured to the plate 4' by suitable bolts 6', 7' and 8, which pass through aligned apertures in said plates to secure their plates together in a manner similar to the structure shown in Figure 1. The coupling bolt 37' is also received in aligned apertures in said plates and serves to secure the hitch to the angle iron draw bar 29, indicated in dotted lines.

A latch member 11' is pivotally mounted on a bolt 12' passing through aligned apertures in the bottom and top plates, as will be understood by reference to Figure 7. A compression spring 16' has one end seated against an abutment 17' and its opposite end against a shoulder 18' provided on the latch member, whereby the spring constantly urges the latch member into its operative full line position.

A cam 21' is secured to one end of the shaft 22' and is suitably supported in the top and bottom plates in a manner similar to the shaft 22 shown in Figure 3.

From a careful inspection of Figure 7, it will be noted that the construction of the hitch therein disclosed is very similar to the one shown in Figure 4. The main distinction between the two resides in the fact that the pivot pin 12' of the structure shown in Figure 7 is longitudinally aligned with the hook 44' of the latch member 11 whereby pulling strains exerted on the hitch body will be uniformly distributed thereon, whereas in the structure shown in Figure 4, the pull exerted on the hitch is not uniformly distributed on each side of the hitch because of the pivot bolt 12' being off center, as will readily be understood.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

In a hitch of the class described, a body composed of top and bottom plate elements secured together in fixed spaced relation to provide a cavity therebetween, re-entrant slots in the rear end portion of said plate elements for receiving a coupling pin, an elongated latch member mounted in said cavity and having a hook at one end adapted to traverse said re-entrant slots to secure a coupling pin to the hitch, the opposite end of said latch member being pivoted to said plate elements whereby the latch is normally concealed within the cavity when the latch is in its closed operative position, said latch member having an aperture in its pivoted end portion adapted to register with an aperture in one of said plate elements, when the latch member is swung outwardly into inoperative position, thereby to receive a pin for temporarily securing the latch in open inoperative position, a crank mounted for rocking movement in said plate elements and having a cam secured thereto within said cavity for swinging the latch member into open position, when the crank is relatively rotated, a transversely disposed bar interposed between the forward end portions of said plate elements with its end portions projecting beyond the side edges of the plate elements and each having an aperture therein, and an abutment plate having elongated openings in its end portions adapted to register with the apertures in the end portions of said bar whereby bolts may be inserted through said elongated openings and apertures to adjustably secure the hitch to the draw bar, with its rear edge positioned to engage the forward edge of the draw bar, thereby to facilitate mounting the hitch thereon.

LEONARD E. TREES.

References Cited in the file of this patent

UNITED STATES PATENTS

| Number | Name | Date |
| --- | --- | --- |
| 751,471 | Decker | Feb. 9, 1904 |
| 784,927 | Crisler | Mar. 14, 1905 |
| 795,966 | George | Aug. 1, 1905 |
| 2,384,185 | McElhinney | Sept. 4, 1945 |
| 2,464,424 | Weldon et al. | Mar. 15, 1949 |

FOREIGN PATENTS

| Number | Country | Date |
| --- | --- | --- |
| 590,812 | Great Britain | July 29, 1947 |